Reissued Jan. 4, 1938

Re. 20,614

UNITED STATES PATENT OFFICE 20,614

CONCENTRATION OF ORES

George H. Wigton, Eureka, Utah

No Drawing. Original No. 1,783,207, dated December 2, 1930, Serial No. 375,892, July 3, 1929. Application for reissue October 6, 1931, Serial No. 567,290

15 Claims. (Cl. 209—166)

This invention relates to the concentration of ores by flotation and is particularly applicable to the treatment of those ores in which the valuable minerals occur entirely or in a partially oxidized state. Heretofore, most of the efforts to float oxidized ores have included a preliminary step designed to place a sulfid film on the particles of oxidized minerals, followed by a similar flotation operation to that practiced on sulfid ores. Sulfidizing operations are objectionable on many ores, because they tend to reduce silver extraction if enough sulfidizing agent is added to insure high recovery of the base metals and a clean concentrate. Also, the consumption of the sulfidizing agent on ores containing very much hydrated iron oxide is very high. Efforts to float the oxidized minerals without sulfidizing, by using a reagent with a strong collecting action, like oleic acid, result in flotation so non-selective that good extraction and high grade concentrate are impossible to produce simultaneously.

This application is a continuation in part of my application, Serial No. 287,349, filed June 21, 1928.

The present invention is based on the discovery that a class of compounds formed by the reaction of amino compounds with phosphorus pentasulfid are effective flotation agents, not only for the sulfid minerals, but also for the oxidized minerals of gold, silver, lead and copper. While all the reconstructed amino compounds tried have shown the ability to float oxidized minerals, I have found the reaction products of phosphorus pentasulfid with aniline, orthotoluidine and alpha naphthylamine, respectively, to give most satisfactory results.

The reaction products of amino compounds with phosphorus pentasulfid are solids. In flotation operations it is advantageous to have the reagents in a liquid condition in order that they may easily and accurately be added to the flotation pulp. Consequently it becomes desirable to dissolve these solid reaction products in an inert solvent, such as benzol, for example. In some cases it may be preferable to dissolve the amino compound in an inert liquid hydrocarbon before reacting it with phosphorus pentasulfid. A liquid product may also be obtained by reacting a large excess of a liquid amino compound with phosphorus pentasulfid or by reacting a solution of a solid amino compound in a liquid amino compound with phosphorus pentasulfid.

The reaction product of phosphorus pentasulfid with a solution of alpha naphthylamine in ortho toluidine gives particularly good results on the ore with which I have been working. It may be prepared in the following manner:

10 grams pulverized phosphorus pentasulfid was slowly added to a solution of 40 grams alpha naphthylamine in 20 grams ortho toluidine, with constant stirring. Stirring was continued occasionally for one hour, at the end of which time a brown translucent liquid resulted. The liquid was viscous, but not enough so to prevent satisfactory feeding of such a reagent in mill operations.

To illustrate the action of this compound, results are given of a test on oxidized ore from the Eureka Lilly mine. This ore is highly oxidized, containing only 0.2% sulfur. The ore was ground with water in a laboratory ball mill until it passed a 100 mesh screen. The pulp was then placed in a laboratory flotation cell and subjected to flotation operations.

Reagents were aded in four stages. Sodium silicate solution was added to properly condition the pulp and to prevent excess frothing in the later stages. The compound referred to above acted both as collecting agent and frothing agent. The following table shows the amount of reagents in pounds per ton added at each stage. Each stage covered a period of five minutes.

| Stage | Sodium silicate | Reconstructed alpha naphthylamine and ortho toluidine |
|---|---|---|
| 1 | 0 | 0.25 |
| 2 | 2½ | 0.25 |
| 3 | 2½ | 0.25 |
| 4 | 2½ | 0.25 |

The results of the test were as follows:

| | Per cent wt. | Assay | | | | Per cent recoveries | | |
|---|---|---|---|---|---|---|---|---|
| | | Au | Ag | Pb | Ins | Au | Ag | Pb |
| Ore | 100.00 | .217 | 3.22 | 13.50 | 69.4 | ------ | ------ | ------ |
| Concentrate | 27.64 | .42 | 8.0 | 41.5 | 32.4 | 53.38 | 68.63 | 84.96 |
| Tailing | 72.36 | .14 | 1.4 | 2.8 | ------ | 46.62 | 31.37 | 15.04 |

It will be understood that the foregoing is only a single example of procedure, and I do not wish the invention to be limited to this specific agent or method.

I claim:

1. The process of concentrating oxidized ores by froth flotation which comprises subjecting the ore in the form of a pulp to a flotation operation in the presence of the reaction product of an oxygen free aromatic amino compound and phosphorus pentasulfid.

2. The process of concentrating oxidized ores by froth flotation which comprises subjecting the ore in the form of a pulp to a flotation operation in the presence of the reaction product of alpha naphthylamine and phosphorus pentasulfid.

3. The process of concentrating oxidized ores by froth flotation which comprises subjecting the ore in the form of a pulp to a flotation operation in the presence of the reaction product of phosphorus pentasulfid with a solution of alpha naphthylamine in ortho toluidine.

4. The process of concentrating oxidized ores by froth flotation which comprises subjecting the ore in the form of a pulp to a flotation operation in the presence of the reaction product of an oxygen free aromatic amino compound with sulfur and phosphorus.

5. An agent for use in flotation comprising the reaction product of alpha naphthylamine with phosphorus pentasulfid.

6. An agent for use in flotation comprising the reaction product of phosphorus pentasulfid with a solution of alpha naphthylamine in ortho toluidine.

7. The process of concentrating oxidized ores by froth flotation which comprises subjecting the ore in the form of a pulp to a flotation operation in the presence of sodium silicate and the reaction product of an oxygen free aromatic amino compound and phosphorus pentasulfid.

8. The process of concentrating oxidized ores by froth flotation which comprises subjecting the ore in the form of a pulp to a flotation operation in the presence of sodium silicate and the reaction product of alpha naphthylamine and phosphorus pentasulfid.

9. The process of concentrating oxidized ores by froth flotation which comprises subjecting the ore in the form of a pulp to a flotation operation in the presence of sodium silicate and the reaction product of phosphorus pentasulfid with a solution of alpha naphthylamine in ortho toluidine.

10. The process of concentrating oxidized ores by froth flotation which comprises subjecting the ore in the form of a pulp to a flotation operation in the presence of sodium silicate and the reaction product of an oxygen free aromatic amino compound with sulfur and phosphorus.

11. The process of concentrating ores by froth flotation which comprises subjecting the ore in the form of a pulp to a flotation operation in the presence of sodium silicate and in the presence of the reaction product of an oxygen free aromatic amino compound and phosphorus pentasulfid, the reaction product being added to the pulp in stages.

12. The process of claim 7 in which the amino compound is dissolved in an inert liquid hydrocarbon prior to mixing with the phosphorus pentasulfid.

13. The process of concentrating ores by froth flotation which comprises subjecting the ore in the form of a pulp and in presence of sodium silicate to a flotation operation in the presence of successive stage additions of the reaction product of an amino compound and phosphorus pentasulfid.

14. The process of concentrating oxidized ores by froth flotation which comprises subjecting the ore in the form of a pulp to a flotation operation in the presence of sodium silicate to render the circuit non-alkaline, and in the presence of the reaction product of an oxygen free aromatic amino compound and phosphorus pentasulfid.

15. The process of concentrating ores which are largely oxidized which consists in subjecting the ore in the form of a pulp to a flotation operation in a circuit made non-alkaline by the addition of sodium silicate, in the presence of the reaction product of an oxygen free aromatic amino compound and phosphorus pentasulfid, said reagent being added to the pulp in stages so as first to remove any sulfid mineral, which sulfid mineral tends to prevent the complete flotation of the oxidized mineral with only one addition of reagent.

GEORGE H. WIGTON.